Figure 1:
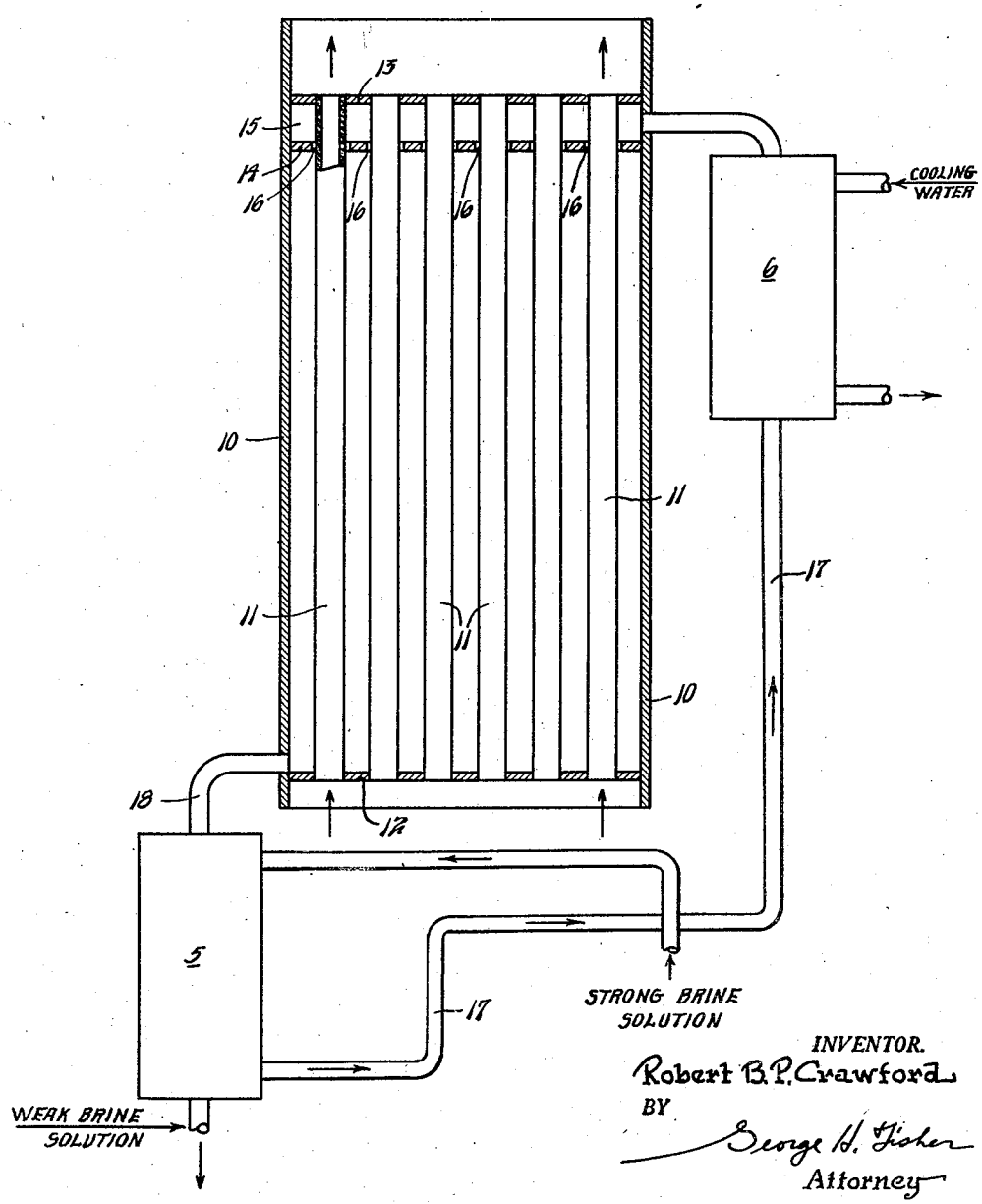

Dec. 30, 1947. R. B. P. CRAWFORD 2,433,741
CHEMICAL DEHUMIDIFYING METHOD AND MEANS
Filed Feb. 13, 1943 2 Sheets-Sheet 2

INVENTOR.
Robert B. P. Crawford
BY
George H. Fisher
Attorney

Patented Dec. 30, 1947

2,433,741

UNITED STATES PATENT OFFICE 2,433,741

CHEMICAL DEHUMIDIFYING METHOD AND MEANS

Robert B. P. Crawford, Miami, Fla.

Application February 13, 1943, Serial No. 475,777

13 Claims. (Cl. 183—2)

The present invention relates to the removal of water vapor from gases, and particularly to the dehumidification of air, for example in air conditioning.

Although the majority of commercial air conditioning as practiced today has undoubtedly been carried out through the use of mechanical refrigeration, the removal of moisture from the air chemically by means of brine solution has enjoyed a certain amount of commercial success. There are however, some objections to chemical dehumidification of which the most important are cost, entrainment of the chemicals in the air and corrosion of the apparatus as a result of the use of chemicals. The present invention relates to a new method and means for chemically removing moisture or water vapor from a gas, such as air, in such manner that the cost of the apparatus for handling a given amount of air is greatly reduced and entrainment of the brine with the air, as well as corrosion, are eliminated by causing removal of the moisture or water vapor without having the air come in actual physical contact with the brine.

It is well known that the vapor pressure of many brines (for example zinc chloride, caustic soda or sulphuric acid) is relatively low (around one or two millimeters at normal temperatures) in respect to the vapor pressure of air containing moisture (approximately 23 millimeters in humid summer). It is likewise well known that the size of a water vapor molecule is considerably smaller than that of an air molecule (approximately ⅔). The present invention therefore contemplates passing the air to be dehumidified in close proximity to a brine solution of relatively high strength and low aqueous vapor pressure but preventing actual physical contact and intermixing thereof by interposing between the air and the brine solution a porous wall or semipermeable membrane or fine screen in which the openings are of such size as to permit the smaller water vapor molecules to pass therethrough relatively easily while making it difficult, for the air molecules to pass therethrough. In other words, the present invention contemplates the use of a permeable membrane of the order of magnitude of a molecular filter to permit the passage of water molecules from the air into the brine solution while at the same time greatly restricting, the passage of the air molecules into the brine solution.

This transfer of the water molecules from the air to the brine solution through the filter will take place because of the lower vapor pressure of the brine solution in respect to the air to be dehumidified. This action may be enhanced, if desired, by placing the brine solution under vacuum thereby creating a larger pressure differential between the air and the brine. Any other means of creating this larger pressure differential may of course be utilized.

By means of this arrangement, and through using relatively high velocity, for example in the neighborhood of two to three thousand feet per minute, the cost of the apparatus in respect to the amount of moisture removed can be greatly reduced in comparison to present chemical dehumidification systems. Further, since the air and the brine are separated by a membrane acting as a molecular filter they are not in contact with each other in the main air passages and the brine solution particles will not entrain or be contaminated with the air. Although it is possible that some air molecules will be drawn into the brine by the pressure differential through the membrane, the reverse action will not take place so that the air will remain free from entrainment. Furthermore, corrosion will be eliminated since corrosion takes place due to the cleaning action of the brine and then the subsequent contacting of such clean surfaces by the air, which is never entirely dry. Since the air and brine are not intermixed there will be no brine in that part of the system handling air to cause a cleaning action; and in the brine part of the system, there will be no air, or so little air as to greatly reduce if not entirely eliminate corrosion.

Since the brine in absorbing the water vapor becomes weaker or less concentrated, some means must be provided for supplying concentrated brine solution to the apparatus. From an economical standpoint this means that the brine in weak solution should be concentrated and this may be done in any of the now well known manners although I provide herein, as will be later explained, a new type of chemical brine concentrator which not only has utility within itself for use in other systems of dehumidifying air but is also particularly usable in connection with my present dehumidifying apparatus.

It is an object of my invention, therefore, to provide a new method of dehumidification by passing a moisture containing gas in close proximity to a brine solution having a lower vapor pressure and separated from the moisture containing gas by a porous membrane for preventing the passage of any substantial number of the gas molecules into the brine while permitting the passage of water molecules through the membrane and into the brine solution.

More specifically, it is an object of my invention to provide for the removal of water vapor from a gas by passing or causing the water vapor molecules to pass through a membrane by applying an attractive force in the nature of a solution having a lower vapor pressure than the gas.

A further object of my invention is to enhance the passage of the water molecules from the gas into the other solution by mechanically providing a vapor pressure differential or pressure differential therebetween, and particularly by placing the side of the membrane which is not contacted by the gas under vacuum.

Another object of my invention is the provision of a new brine concentration apparatus and means for controlling the same.

More specifically it is an object of my invention to control the heating of brine which is placed in intimate contact with air in a brine concentrating chamber by the temperature of the brine before and after it contacts such air and by the temperature of the air after it leaves the brine, particularly where the brine and air flow in counter-current relationship to each other.

It is a further object of my invention to control the heating of brine to be concentrated in such manner as to maintain a predetermined differential in the temperature of the brine before and after it contacts a stream of air and to vary such temperature differential by the temperature of the air after it has been contacted by the brine.

Figure 2:
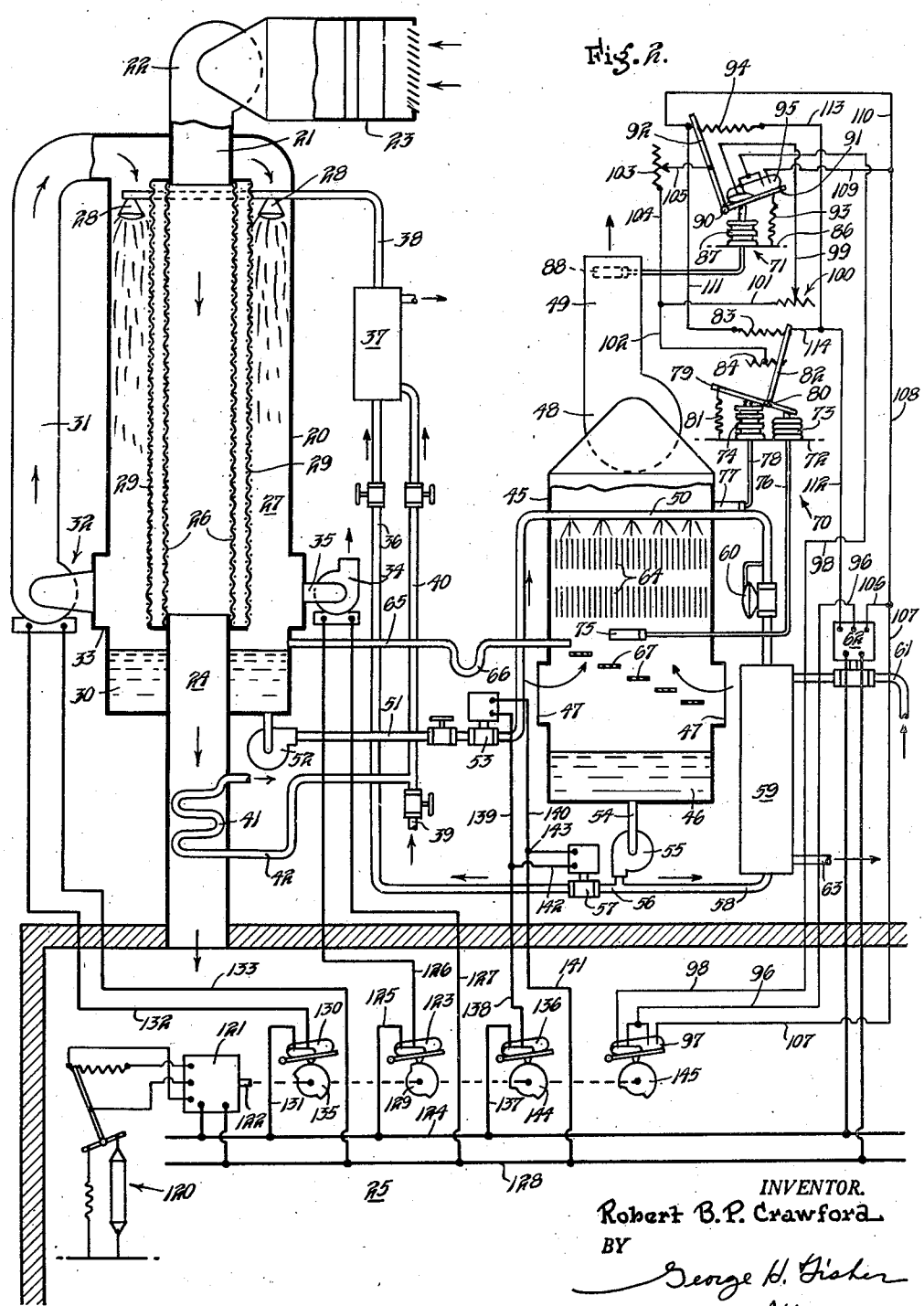

Other objects and advantages of my invention will become clear from a study of the following detailed description in connection with the accompanying drawing, in which:

Figure 1 is a showing of a simple apparatus for removing moisture from air in accordance with the present invention; and Figure 2 is a more refined apparatus for removing moisture from air in accordance with the principle disclosed in connection with the apparatus of Figure 1, together with a novel brine concentrator as well as a complete control arrangement for the entire system.

Referring first to Figure 1, the dehumidifying apparatus therein disclosed comprises a cylindrical open ended container 10 provided with a number of membraneous separators herein disclosed in the form of porous tubes 11. The porous tubes 11 may be of any suitable material such as porous carbon tubes, glass matting backed up by a fine screen, or any other suitable material so long as it provides a porous membrane that will permit water molecules to pass therethrough relatively easily while preventing or substantially preventing the passage of air molecules therethrough. This action, while in effect a filtering action, might properly be described as atmolysis. The tubes 11 are supported at the bottom of the casing 10 by a closure member 12 through which the tubes extend and at the top by a similar closure member 13. In addition, there is a member 14 located near the upper end of the tubes 11 but spaced from the member 13 so as to leave a passage 15 therebetween. The member 14 is provided with holes 16 through which the tubes 11 extend, the holes 16 being larger than the outside diameter of the tubes 11 so as to leave clearance or a space therearound.

The air to be dehumidified passes upwardly through the tubes 11 as indicated by the arrows. Strong brine solution passes through a pipe 17 into the space or chamber 15 and then runs down the outside of the tubes 11 through the holes 16. This brine, in its weakened condition, gathers at the bottom of the casing 10 and flows therefrom through a pipe 18.

As stated above, the brine solution may take the form of a zinc chloride solution, caustic soda solution, or sulphuric acid solution, having a vapor pressure around one or two millimeters at 90° whereas the air to be dehumidified will have a vapor pressure of approximately 23 millimeters upon entering chamber 10. Due to this difference in pressure, the brine provides a positive pulling force and, since the porous tubes 11 permit relatively free passage of water molecules but restrict the passage of air molecules, the water vapor in the air to be dehumidified, or part of it, will pass through the tubes 11 and into the brine solution. As a result, the moisture content of the air being dehumidified will be reduced and the brine solution will be weakened. Any suitable means may be provided for circulating the air to be dehumidified, for circulating the brine solution, and for providing a strong or concentrated brine solution either by continuously supplying such a strong solution or by reconcentrating the weakened solution.

Heat is generally applied to brine for the purpose of concentrating it and the brine should be cooled before it is passed into the chamber 10. To this end, the pipe 17 first passes through a heat exchanger 5 through which the pipe 18 likewise passes. In this manner, heat is given up by the hot concentrated brine in pipe 17 to the cooler weakened brine in pipe 18 thereby furnishing some of the heat necessary for reconcentrating the weakened brine. The pipe 17 then passes through a further heat exchanger 6, where it is cooled by cooling water to a temperature slightly above the solidification point.

Turning now to Figure 2, a more refined dehumidifying apparatus as well as a brine concentrator together with automatic control mechanisms for each of them is disclosed. A vertical dehumidifying chamber 20, which may be cylindrical in form, is provided with an air inlet pipe 21 which is supplied with the air to be dehumidified by a fan 22 which takes air from any suitable source, as for example the outdoors or from the return of an air conditioning system, through a duct 23. The dehumidifying chamber 20 is further provided with an outlet pipe 24 which connects with a room or space 25 to be conditioned. The outlet pipe 24 extends upwardly into the dehumidifying chamber 20 and is axially aligned with the inlet pipe 21. A molecular filter, which takes the form of a cylindrical fine mesh screen or semi-permeable membrane, joins the inlet pipe 21 and the outlet pipe 24 so that there is a continuous passage through the dehumidifying chamber 20 within which passage the air to be dehumidified is constrained. The space 27 between the dehumidifying chamber 20 and the membrane filter 26 comprises a spray chamber into which the brine solution is sprayed by means of sprays 28 located near the top of the dehumidifying chamber 20. If desired, a further relatively coarse screen, cylindrical in form, may surround but be spaced from the molecular filter 26 as shown at 29. This further screen 29 has a somewhat larger mesh and may be omitted although it helps to keep the brine from contacting the outside of the molecular filter 26. The sprayed brine collects in the bottom of the dehumidifying chamber 20 in a sump 30.

In order to provide greater efficiency, the mist formed by some of the sprayed brine solution and the air in the spray chamber 27 may be recirculated at high velocity by means of a by-pass or recirculating pipe 31 having its upper end connected to the top of the dehumidifying chamber and its lower end connected to an electrically operated fan 32, the intake of which is connected to a bustle 33 formed in the lower portion of the dehumidifying chamber 20. Also, in order to create a pressure differential between the air to be dehumidified and the brine in the spray chamber 27, or to increase the pressure differential therebetween, an electrically operated vacuum producing pump 34 is connected to the opposite side of bustle 33 by a pipe 35.

Concentrated brine for the sprays 28 may be obtained from any suitable source and supplied to a pipe 36 which preferably then goes through a brine precooler 37 after which the strong brine solution passes to the sprays 28 by means of a pipe 38. Cooling water for the brine cooler 37 may be obtained from any suitable source and is supplied thereto by pipes 39 and 40. Also, in order to reduce the temperature of the dehumidified air, a cooling coil 41 may be located in the air passage 24 and supplied with cooling water from the same source by means of a pipe 42 which connects to the pipe 40.

With this much of the system of Figure 2 as has thus far been described and assuming that the air circulating fan 22, the recirculating fan 32, and the vacuum producing means 34 are all in operation, and further assuming that there is a source of strong brine solution which is being supplied to the pipe 36 and therefore to the sprays 28, the apparatus operates in the following manner. Air is taken in by means of duct 23 from the outside or from the return line of an air conditioning system and is caused to pass through the passage formed by the inlet duct 21, the membrane filter 26 and the outlet pipe 24. The dehumidified air then passes over the cooling coil 41 and is delivered into the room or space 25. This air at 23 will have a vapor pressure of, say 23 millimeters, as it enters the top of the dehumidifying chamber 20. The vapor pressure of the brine solution, in accordance with the foregoing example, would be around one or two millimeters. The vacuum producing means 34 can of course be adjusted as desired and if adjusted so as to produce a vacuum of about 50 millimeters there will be a total differential of about 71 millimeters between the vapor pressure of the air entering the dehumidifying chamber 20 and the vapor pressure of the sprayed brine as well as the recirculated brine mist in the spray chamber 27. As a result, the water molecules, or some of them, will pass through the filter 26 and into the spray chamber 27. However, the air molecules will not pass therethrough, or very few of them in relation to the total number of air molecules. As a result, moisture will be removed from the air and as this air reaches the lower portion of the dehumidifying chamber 20 sufficient moisture may be removed so that the vapor pressure of the air is now only 5 millimeters. The pressure differential may be thus reduced to 55 millimeters. This still, however, is a relatively large pressure differential with the result that water molecules will be continuously removed from the air as it passes down through the dehumidifying chamber 20. As in the case of Figure 1, this is accomplished without there being any actual contact between the air and the brine. The system of Figure 2 will remove more water molecules from the air than the system of Figure 1, however, due to the increased differential provided by the vacuum producing means 34. Also, the relatively rapid recirculation of the brine mist by means of the recirculating fan 32 and recirculating passage 31 will further increase the efficiency of the apparatus by reducing the brine film through which water vapor molecules must pass to be absorbed. Further, the relatively coarse screen 29 together with the vacuum produced by the vacuum producing means 34 tends to keep the sprayed brine and brine mist from having intimate contact with the outside of the molecular filter 26 and this further increases the rate at which the water molecules pass through the molecular filter 26. In this manner, water is removed from the air to be dehumidified at a rapid rate and therefore the size and proportionate cost of the equipment is relatively low. All this is accomplished without there being any entrainment of the brine with the air being dehumidified and with a great reduction, if not an entire, elimination of corrosion. It should also be noted that since the brine does not come into contact with the air being dehumidified and since there is no entrainment of the brine in such air, it is therefore possible to use inexpensive brines having the desired characteristics, which brines might well be unsuitable in other types of systems where entrainment would take place, since such brines might well contaminate the air and be dangerous to health or furnishings of the space to which the dehumidified air is delivered.

As stated above, the concentrated brine solution supplied to pipe 36 may be taken from any suitable source of supply but I prefer to use a particular type of brine concentrating means and control apparatus which controls both the brine concentrating means and the dehumidifying means. To the right of the dehumidifying chamber 20 is a brine concentrator comprising a concentrating chamber 45 having a sump 46 at its bottom and air inlets 47 above the sump 46. The top of the brine concentrating chamber 45 is connected to a fan 48 which pulls air into the brine concentrating chamber 45 by way of the air inlet openings 47 and discharges it through a discharge pipe 49. Any suitable source of air may be used but preferably this air is taken from outdoors and is discharged to the outdoors. Located near the top of the brine concentrating chamber 45 is a brine spray 50 in the form of a pipe having sprays attached thereto. The weak brine solution gathered in the sump 30 of the dehumidifying chamber 20 is supplied to the left-hand end of the brine spray 50 by means of a pipe 51. Included in the pipe 51 is a pump 52 for pumping the weak brine solution from the sump 30 to the sprays 50. The pipe 51 additionally includes an electrically operated on and off valve 53, which may for example be of the solenoid type, the purpose of which will be explained hereinafter.

An outlet pipe 54 connects to the bottom of the sump 46 of the brine concentrator and leads to a pump 55. Part of the discharge from the pump leads to the sprays 28 of the dehumidifying chamber 20 by way of the pipe 36 and a pipe 56, there being an on and off electrically operated valve 57 of the solenoid type between these two pipes. Additionally, part of the discharge from the pump 55 is recirculated back to the sprays 50 by means of a pipe 58 which is associated with a heat exchanger 59. Also located in the pipe 58 between the heat exchanger 59 and the spray 50 is a pressure responsive valve 60 which so controls the flow of brine through the pipe 58 as to maintain a substantially constant pressure on the sprays 50. The heat exchanger 59 is heated in any suitable manner, for example, by steam which is supplied thereto by a pipe 61 through an electrically operated modulating valve 62 and is discharged therefrom by a pipe 63.

Also located within the brine concentrating chamber 45 are contact surfaces 64 over which the brine runs. This is for the purpose of obtaining more intimate contact between the brine which flows downwardly and the air which flows upwardly. Additionally, an overflow pipe 65 interconnects the top of the sump 30 of the dehumidifying chamber 20 with the brine concentrating chamber 45 so that if too much weak solution gathers in the sump 30, the overflow may flow into the brine concentrator 45. In order to prevent breaking of the vacuum in the dehumidifying chamber 20, the overflow pipe 65 is provided with a trap of any suitable form, herein shown as an ordinary goose neck 66. Also located in the brine concentrating chamber 45 is a series of baffle plates 67 down which the overflowing brine trickles.

The modulating steam valve 62 is controlled by a differential temperature controller generally indicated at 70, the differential temperature at which such controller controls being in turn adjusted by a temperature controller 71 which responds to the temperature of the air being discharged from the brine concentrator.

The differential controller 70 comprises a supporting base 72 which supports a pair of bellows 73 and 74. The bellows 73 is connected to a bulb 75 by a tube 76, as is well known, and the bulb 75 is located below the plates 64 so as to respond to the temperature of the brine leaving such plates. The bellows 74 is connected to a bulb 77 by a tube 78. The bulb 77 responds to the temperature of the solution entering the sprays 50 and is shown mounted in intimate contact with the spray pipe 50. These two bellows cooperate with an arm 79 pivoted at 80 at a point intermediate the two bellows and biased to rotate in a counter-clockwise direction by a spring 81 having one of its ends secured to the left-hand end of arm 79 and its other end secured to the supporting base 72. Extending at right angles from the arm 79 is a slider arm 82 which cooperates with a controlling resistance 83 and additionally cooperates with a corrector resistance 84.

The temperature responsive controller 71 includes a supporting base 86 that supports a bellows 87 connected to a bulb 88 by a tube 89. As stated above, the bulb 88 responds to the temperature of the air leaving the brine concentrator and is herein shown as being located in the discharge pipe 49. The bellows 87 operates a bellcrank pivoted at 90 and having a generally laterally extending arm 91 and a generally vertical extending arm 92 which comprises a contact arm. The arm 91 is biased so as to rotate the bellcrank in a clockwise direction about its pivot 90 by means of a spring 93 having one end secured to the right-hand end of arm 91 and its other end secured to the supporting base 86. The contact arm 92 cooperates with a compensating resistance 94. The arm 91 supports a mercury switch 95 of the double ended or double circuit type 95. The relationship of the parts is so arranged that the electrodes in the left-hand end of mercury switch 95 are closed for all positions of the contact arm 92 except when the contact arm 92 engages the extreme right-hand end of compensating resistance 94.

The electrical modulating valve 62 has the usual three control wires, one of which is a common wire 96. This common wire 96 leads to the common electrodes of a double ended mercury switch 97 which is operated in a manner that will be described hereinafter. Normally, when the system is in operation, the circuit is closed through the left-hand end of mercury switch 97 so that common wire 96 is connected to a further branch 98 of the common wire. This wire 98 leads to the common electrodes of the mercury switch 95 and a wire 99 leads from the other left-hand electrode of the mercury switch 95 and therefore constitutes a further extension of the common wire. Wire 99 connects to an adjusting rheostat 100 and the resistance of such rheostat is connected to the middle of the corrector resistance 84 by wires 101 and 102. It is further connected to the resistance of a rheostat 103 by wires 101 and 104. The contact of rheostat 103 is connected to the contact arm 92 by a wire 105.

The electrically operated valve 62 additionally includes a valve controlling wire 106 that has a branch 107 connecting to the right-hand terminal of mercury switch 97. It has a further branch 108 which similarly connects to the right-hand terminal of mercury switch 95. In addition, wire 108 is connected to the left-hand end of compensating resistance 94 by a wire 110 and to the left-hand end of the control resistance 83 by wire 110 and a wire 111. Electrical valve 62 additionally includes a controlling wire 112 which is connected to the right-hand end of compensating resistance 94 by a wire 113 and to the right-hand end of control resistance 83 by a wire 114.

The temperature differential responsive mechanism 70 is so arranged and adjusted that with the contact arm 82 at the right-hand end of control resistance 83 as shown in Figure 2, there is a temperature differential of 50 degrees between the temperature of the brine entering the sprays 50 and that leaving the contact plates 64. On the other hand, when this temperature differential drops down to 17 degrees, the contact arm 82 is in engagement with the extreme left-hand end of control resistance 83. The temperature responsive controller 71 has a range of 135° F. down to 80° F. When the temperature of the air leaving the concentrator is 135° F., the contact arm 92 is engaging the left-hand end of compensating resistance 94. If the temperature falls to 80° F., the contact arm 92 engages the right-hand end of compensating resistance 94, and at this time, the mercury switch 95 has its position reversed so that the circuit between the left-hand electrodes thereof is broken and the circuit between the right-hand electrodes thereof is closed.

With the parts in the position shown, the complete system is operating in that fan 22 is causing air to pass through the dehumidifying chamber 20, the recirculating fan 32 is recirculating the brine mist, the vacuum producing means 34 is producing a vacuum within the spray chamber 27, the pump 52 is pumping weak brine from the sump 30 to the spray 50, the electrical valves 53 and 57 are open, the pump 55 is taking the more concentrated solution from the sump 46 and recirculating some of it to the sprays 50 and returning the rest to the sprays 28 of the dehumidifying chamber 20, and the steam valve 62 is wide open. Also, the temperature differential between the brine entering the sprays 50 and leaving the contact plates 64 is 50 degrees. The parts are so arranged that under such conditions the actual brine temperature is about 180° and the quantity of air flowing through the concentrator is such that the leaving air temperature is 135°. It is obvious that in order for the air flowing through the chamber 45 to remove moisture from the weak brine solution, water must be evaporated therefrom. This requires heat and the giving up of heat by the brine heats the air to 135°. This giving up of heat by the hot brine results in the temperature differential of 50 degrees, aforementioned.

Let us now assume that the concentration of the brine becomes stronger, either due to the action of the brine concentrating chamber 45 or due to a reduction in load on the dehumidifying chamber 20 or by reason of the fact that the air passing through the brine concentrating chamber 45 becomes drier. Regardless of which condition causes the brine solution to become stronger, such increase of strength in the brine solution results in there being less water evaporated therefrom. As a result, less heat is being taken out of the brine coming from the sprays 50. It therefore follows that the temperature differential will become less. If this occurs, then the pressure in bellows 73 in respect to the pressure in bellows 74 will increase and arm 79 will rotate somewhat in a counter-clockwise direction thereby moving contact arm 82 away from the right-hand end of resistance 83. This decrease in the amount of water evaporated may likewise cause the leaving air temperature to increase but this can have no effect upon the control system since at 135° the contact arm 92 is at the extreme left-hand end of compensating resistance 94. Such movement of contact arm 82 away from the extreme right-hand end of control resistance 83 operates to close the valve 62 somewhat. This reduces the amount of heat applied to the brine being recirculated to the sprays 50 so that its temperature will not be so great. As a result, the temperature of the air leaving the concentrator will likewise drop and will drop below 135°. Such drop in temperature causes the contact arm 92 to move away from the left-hand end of compensating resistance 94 somewhat towards its right-hand end. The result of this action is to shift the control point of differential controller 70 to the left so that it now operates to maintain a temperature differential of less than 50 degrees. A balance of course will be struck under these new conditions wherein a newer and lesser differential is maintained between the brine being sprayed by the sprays 50 and the temperature of the brine leaving the contact plates 64 and wherein the temperature of the air leaving the concentrator will become constant but at a value less than 135°.

If the load on the system should become light enough, or if for any other reason the concentration of the brine should become strong enough, so little water will be evaporated that the differential controller 70 will be controlling at the extreme left-hand end of control resistance 83 or at a differential of 17 degrees. Also, the temperature of the air leaving the concentrator will drop to 80°, thereby requiring this low differential of the differential controller 70. When this occurs, mercury switch 95 will be tilted so as to break the connection between wires 98 and 99 and will instead connect wire 98 to wire 109 which is in turn connected to the valve controlling wire 106 by the wire 108. The steam valve 62 will therefore be completely closed.

In this manner, as the concentration of the brine solution increases, the temperature of the air leaving the concentrator is reduced and the differential in temperature between the entering and leaving brine is reduced and this in turn is caused to control the steam valve.

If the brine concentration should now become weaker, this means there is more water in the brine and more water will be evaporated. This requires more heat with the result that the temperature differential will widen. The differential controller 70 in trying to maintain its predetermined temperature differential will open the steam valve 62 more widely. This results in more heat being delivered to the brine going to the sprays 50 and the temperature of the air leaving the concentrator 45 will likewise increase. Compensator 71 will respond to this increase in temperature and move its arm 92 towards the left thereby shifting the control point of the differential controller 70 towards the right so that it tends to maintain a higher differential. This will continue until a balance is reached, or if the load on the system is too great, it will continue until the original conditions are restored wherein the temperature of the air leaving the concentrator is 135°, the temperature of the brine entering it is 180°, and the temperature of the brine going to the sump 46 is 130°, in other words a differential of 50 degrees.

Electrical control systems of the general type in which a modulating valve is controlled by a potentiometer controller, the control point of which is in turn shifted by the compensator, are not new per se. If more complete information as to the exact workings of such a control circuit or modulating valve is desired, reference may be had to Haines Patent 2,173,331 granted September 19, 1939, and particularly Figure 3 thereof, where such a modulating motor is controlled by a temperature responsive device, the control point of which is shifted in accordance with the relative humidity and outdoor temperature conditions so as to provide what is known in the air conditioning art as a compensated effective temperature control arrangement.

The complete system as thus far described lends itself very well to being controlled by the moisture content of the air in the space or room 25. To this end I have shown a potentiometer type relative humidity controller 120 in control of a modulating motor 121 which in turn variably positions a shaft 122 in accordance with changes in relative humidity.

The vacuum producing means 34 is controlled by a mercury switch 123 through a circuit as follows: line wire 124, wire 125, mercury switch 123, wire 126, vacuum producing means 34, and wire 127 to the other line wire 128. The mercury switch 123 is positioned by a cam 129 in turn operated by the shaft 122 of the modulating motor 121. With the parts in the position shown, the relative humidity is at the highest desired value and mercury switch 123 is closed. The system is therefore operating in the manner heretofore described.

Now, if the relative humidity should drop two per cent, the shaft 122 will rotate to such extent that the portion of cam 129 having the larger radius will completely pass under the mercury switch 123 and mercury switch 123 will open in a manner well known in the art. Therefore, upon a two per cent drop in humidity in the room or space 25, the vacuum producing means 34 will have its operation discontinued. As a result, there is a smaller differential in pressure between the air being dehumidified and the spray chamber 27 so that less water molecules will pass through the molecular filter 26. The humidity of the air being delivered to the room or space 25 therefore will not be reduced to such a great extent.

The recirculating fan 32 for the brine mist is similarly controlled by a mercury switch 130 through a circuit comprising line wire 124, wire 131, mercury switch 130, wire 132, brine mist recirculating fan 32, and wire 133 to the other line wire 128. The mercury switch 130 is positioned by a cam 135. The shape of this cam is such that the mercury switch 130 remains closed until the relative humidity has dropped four per cent below the extreme value shown, or in other words two per cent below that value at which the vacuum producing means 34 has its operation discontinued. When the humidity has been lowered to this extent, the brine mist recirculating fan 32 is stopped so that the brine mist is no longer recirculated at high velocity. This again reduces the amount of moisture removed from the air being supplied to the room or space 25 since now the only moisture removed is due entirely to the difference in vapor pressure between the sprayed brine mist and the air to be dehumidified, without the helping action of the rapid velocity movement of the brine mist or the helping action of the vacuum producing means.

The solenoid valves 53 and 57 are controlled by a third mercury switch 136. The circuit for solenoid valve 53 is as follows: line wire 124, wire 137, mercury switch 136, wire 138, wire 139, solenoid valve 53, wire 140, and wire 141 to the other line 128. The circuit for solenoid valve 57 is as follows: line wire 124, wire 137, mercury switch 136, wire 138, wire 142, solenoid valve 57, wire 143, and wire 141 to the other line wire 128. The mercury switch 136 is positioned by a cam 144 also driven by the shaft 122 of the modulating motor 121. The shape of cam 144 is such that mercury switch 136 remains closed during high humidities and does not open until the humidity has dropped, say six per cent below the extreme value, or two per cent below that value at which brine recirculating fan 32 is turned off. When the relative humidity has been reduced to this extent, solenoid valves 53 and 56 close. Closing of solenoid valve 57 prevents the delivery of concentrated brine to brine sprays 28 in the dehumidifying chamber 20 and closure of the solenoid valve 53 stops circulation of weak brine solution from the sump of the dehumidifying apparatus to the sprays 50 of the brine concentrator.

The steam valve 62, in addition to being controlled by the apparatus heretofore described, is also controlled by the mercury switch 97. This mercury switch is controlled by a cam 145 operated by shaft 122 of the modulating motor 121. The construction and arrangement of cam 145 is such that it remains in the position shown during high humidity in the room or space 25 and does not move sufficiently to operate mercury switch 97 until such time as the solenoid valves 53 and 57 are closed. When this occurs, the position of mercury switch 97 is reversed. Breaking of the circuit of the left-hand electrodes of mercury switch 97 entirely disconnects common wire 96 from the differential controller 70 and the temperature controller 71. Closure of the right-hand terminals connects common wire 96 to wire 107 which in turn is connected to the valve controlling wire 106 with the result that the steam valve 62 is closed.

Since the solenoid valves 53 and 57 are now closed and since the steam valve 62 is likewise closed, there is no utility in maintaining the pumps 52 and 55 or the fan 48 in operation and all of these devices may now be deenergized. This can be simply accomplished by the mercury switch 136 or by providing additional switches in a manner that will be clear from the preceding description.

From the foregoing it will be clear that I have provided a novel system of dehumidification of the chemical type which is completely automatic in its operation, including the reconcentration of the brine used therein. Further, I have provided a novel brine reconcentrator and control system therefore which, while it has particular utility in my complete system, is also useful in other systems wherein it is desired to reconcentrate a weak solution. In addition I have provided a new method and means of removing water vapor from air without the air and removing agent coming in actual physical contact with each other.

It will be obvious that many changes can be made in the various portions of my invention as well as in the complete arrangement without departing from the fundamentals thereof and I therefore intend to be limited only by the scope of the claims appended hereto.

I claim as my invention:

1. The method of removing water vapor from air, comprising, placing the air containing water vapor in contact with a first side of a selectively permeable member which relatively freely permits the passage of water molecules therethrough while restricting the passage of air, placing a solution having a lower vapor pressure and which has an affinity for water molecules on the second side of said member, and applying a force in addition to the differential of vapor pressure for causing transferal of said water molecules from the first side to the second side of said member.

2. The method of removing water vapor from air, comprising, placing the air containing water vapor in contact with a first side of a semi-permeable member which relatively freely permits the passage of water molecules therethrough while restricting the passage of air, placing a solution on the second side of said member which has an affinity for water molecules, and creating a difference in pressure on opposite sides of said member in addition to the difference in vapor pressure so that the total pressure on said second side is appreciably lower than the pressure on the first side.

3. In a chemical dehumidifying system for air, in combination, means defining a plural compartment chamber for the air to be dehumidified and including a semi-permeable wall portion having means therein which relatively freely permits the passage of water molecules therethrough while restraining the passage of air, said wall portion separating one compartment from another, means for passing air to be dehumidified through one compartment of said chamber and on one side of said wall portion, means for passing a solution having an affinity for water molecules through said other compartment and in proximity to the other side of said wall portion, and means protecting said other side from said solution.

4. In a chemical dehumidifying system for air, in combination, means defining a plural compartment chamber for the air to be dehumidified and including a semi-permeable wall portion having means therein which relatively freely permits the passage of water molecules therethrough while restraining the passage of air, said wall portion at least in part separating one compartment from another, means for passing air to be dehumidified through one compartment of said chamber and on one side of said wall portion, means for passing a brine solution having a lower vapor pressure through said other compartment and in proximity to the other side of said wall portion, and means creating a pressure difference in addition to the vapor pressure differential between said compartments for increasing the rate of passage of water vapor from said one compartment to the other compartment.

5. In a chemical dehumidifying system for air, in combination, means defining a plural compartment chamber for the air to be dehumidified and including a selectively permeable wall portion which relatively freely permits the passage of water molecules therethrough while restraining the passage of air, said wall serving to separate one of said compartments from another, means for passing air to be dehumidified through one compartment of said chamber and adjacent one side of said wall portion, means for passing a solution having an affinity for water molecules through said other compartment and in proximity to the other side of said wall portion, and means in addition to said solution for creating a lower pressure on said last named side of said wall portion than exists on the first named side.

6. In a chemical dehumidifying system for air, in combination, means defining a plural compartment chamber for the air to be dehumidified and including a semi-permeable wall portion having means therein which relatively freely permits the passage of water molecules therethrough while restraining the passage of air, said wall portion serving to separate one compartment from another, means for passing air to be dehumidified through one compartment of said chamber and adjacent one side of said wall portion, and means for passing brine mist having a lower vapor pressure through said other compartment and in proximity to the other side of said wall portion at a relatively high velocity.

7. An air dehumidifying system, comprising, in combination, means forming a pair of chambers having a wall portion therebetween, said wall portion including means which relatively freely permits the passage of vapor molecules therethrough while restricting the passage of air, means for passing air through one of said chambers, means for passing brine having a lower vapor pressure than the air through the other of said chambers, exhausting means for reducing the pressure in said brine chamber, and means responsive to the moisture content of the dehumidified air for first rendering the exhausting means ineffective and then stopping the flow of brine as such moisture content decreases.

8. An air dehumidifying system, comprising, in combination, means forming a pair of chambers having a wall portion therebetween, said wall portion including means which relatively freely permits the passage of vapor molecules therethrough while restricting the passage of air, means for passing air through one of said chambers, means for spraying brine into the other of said chambers, means to recirculate the brine mist resulting from the spraying of the brine through the brine chamber at high velocity, and moisture responsive means to sequentially render said recirculating means and then said spraying means inoperative upon decrease in moisture content of the treated air.

9. An air dehumidifying system, comprising, in combination, means forming a pair of chambers having a wall portion therebetween, said wall portion including means which relatively freely permits the passage of vapor molecules therethrough while restricting the passage of air, means for passing air through one of said chambers, means for spraying brine into the other of said chambers, means to recirculate the brine mist resulting from the spraying of the brine through the brine chamber at high velocity, means to reduce the pressure in said brine chamber, and means responsive to a reduction in moisture content of the air leaving said one chamber to sequentially render said pressure reducing means ineffective and then stop said recirculating means.

10. In a dehumidifying system, in combination, a dehumidifying apparatus including means forming a chamber for the air to be dehumidified and a brine chamber with a separating means therebetween which relatively freely permits the passage of water molecules while restricting the passage of air molecules, a brine concentrating mechanism including a chamber in which brine to be concentrated may be placed in contact with air passing therethrough, means for supplying weak brine thereto having a vapor pressure less than that of the air to be dehumidified, means for heating the brine passing to the concentrating chamber, means responsive to the temperature of the brine before and after it is contacted by the air passing through said concentrating mechanism in control of the brine heating means to maintain the differential between said temperatures substantially constant, means responsive to the temperature of the air leaving the brine concentrating mechanism for reducing the temperature differential upon decrease in the temperature of the air leaving the concentrating mechanism, means for collecting the brine concentrated in said concentrating mechanism and passing it through the brine chamber of said dehumidifying apparatus and returning the same to the brine concentrating mechanism, means to enhance the passage of water molecules from the air through said portion of said chamber into the brine chamber, and means influenced by a reduction of moisture content of the air being dehumidified to first render said enhancing means ineffective and to then stop the circulation of brine to said dehumidifying apparatus and prevent further heating of the weak brine by said brine heating means.

11. In apparatus for conditioning air, in combination, dehumidifier means, means for passing air through said dehumidifier means, means for circulating brine through said dehumidifier means, the brine being weakened therein by absorption of water from the air being treated, a brine concentrator, means for circulating the weakened brine from the dehumidifier means through the brine concentrator and returning concentrated brine to the dehumidifier means, means for heating the weakened brine, means for circulating air through the brine concentrator to carry the excess water removed therein from the brine, means responsive to the difference between the temperatures of the air entering and leaving the brine concentrator for regulating said heating means, and means responsive to the moisture content of the treated air for stopping the circulation of brine and for modifying the control of said heating means so that less heat is supplied said brine when said moisture content reaches a predetermined value.

12. A system for dehumidifying air comprising, in combination, dehumidifier means for air to be dehumidified, means for passing air to be dehumidified therethrough, means for circulating brine through said dehumidifier means, said brine absorbing water vapor from said air and becoming weakened thereby, a brine concentrator, said brine concentrator including means for distributing and concentrating brine in said concentrator, means for collecting said distributed and concentrated brine in said concentrator, means circulating said weakened brine from said dehumidifying means to said distributing means of said concentrator, and means simultaneously circulating concentrated brine from said means collecting concentrated brine to said dehumidifier means and to said distributing means, and means for regulating the recirculating of the concentrated brine to said distributing means to maintain a uniform pressure at said distributing means so that variations in flow may affect only the dehumidifier means.

13. In a dehumidifying system, in combination, dehumidifying apparatus, means for passing the air to be dehumidified through said apparatus, means for circulating brine through said apparatus, said brine absorbing water vapor from said air and being weakened thereby, a brine concentrating apparatus, means supplying said weakened brine to said concentrating apparatus, said weakened brine being concentrated therein, means including first pump means supplying weakened brine from said dehumidifying apparatus to said concentrating apparatus, said concentrating apparatus including means collecting concentrated brine, second pump means of greater capacity than said first pump means circulating said concentrated brine simultaneously to said dehumidifying apparatus and to the concentrating apparatus for reconcentration, said concentrated brine intended for reconcentration supplementing the flow of weakened brine delivered by said first pump, and means responsive to the pressure of the brine delivered to said concentrating apparatus for regulating the flow of said brine to be reconcentrated to insure uniform pressure of delivery of brine to the concentrating apparatus regardless of variations in delivery from the first named pump associated with said dehumidifying apparatus.

ROBERT B. P. CRAWFORD.

REFERENCES CITED

The following references are of record in the file of this patent:

UNITED STATES PATENTS

| Number | Name | Date |
|---|---|---|
| 1,496,757 | Lewis et al. | June 3, 1924 |
| 2,085,028 | Kelley | June 29, 1927 |
| 1,101,489 | Fleming | June 23, 1941 |
| 1,951,281 | Harris | Mar. 13, 1934 |
| 1,961,495 | Hopkins | June 5, 1934 |
| 539,975 | Carey | May 28, 1895 |
| 2,255,069 | Maier | Sept. 9, 1941 |
| 2,290,465 | Crawford | July 21, 1942 |
| 1,365,422 | Meroney | Jan. 11, 1921 |
| 2,223,586 | Thomas | Dec. 3, 1940 |
| 2,336,456 | Anderegg | Dec. 14, 1943 |
| 2,122,012 | Smith | June 28, 1938 |
| 2,284,914 | Miller | June 2, 1942 |
| 2,192,126 | Downs | Feb. 27, 1940 |
| 2,084,997 | Bichowsky et al. | June 29, 1937 |
| 2,156,293 | Kaufman | May 2, 1939 |
| 2,286,618 | Hiller, Jr. | June 16, 1942 |
| 1,883,024 | Smith | Oct. 18, 1932 |